United States Patent
Nagoya et al.

[11] 3,885,908
[45] May 27, 1975

[54] CLOSED ELECTRIC FURNACE AND METHOD FOR OPERATION THEREOF

[75] Inventors: Yoshishige Nagoya; Takashi Takeuchi; Kosuke Murai; Hirota Amano, all of Hachinoheshi, Japan

[73] Assignee: Pacific Metals Co., Ltd., Tokyoto, Japan

[22] Filed: Jan. 15, 1974

[21] Appl. No.: 433,494

[30] Foreign Application Priority Data
Mar. 2, 1973  Japan.............................. 48-24392

[52] U.S. Cl. ......................... 432/1; 13/2; 432/179; 432/223
[51] Int. Cl. ............................................ F27b 3/20
[58] Field of Search ............. 432/1, 179, 223; 13/2; 75/82

[56] References Cited
UNITED STATES PATENTS
| | | | |
|---|---|---|---|
| 904,991 | 11/1908 | Price | 13/2 X |
| 2,694,097 | 11/1954 | Collin | 13/2 X |

*Primary Examiner*—John J. Camby
*Attorney, Agent, or Firm*—Wenderoth, Lind & Ponack

[57] ABSTRACT

A method for operating a closed electric furnace for smelting which comprises effecting complete combustion in the furnace of by-product gases composed mainly of carbon monoxide produced during the reducing smelting of a cold or hot charge of metal oxides with carbonaceous reducing agents such as coke and coal, heating the furnace charge with this combustion heat so as to reduce the electric power consumption and a closed electric furnace suitable for the above operation.

6 Claims, 4 Drawing Figures

CLOSED ELECTRIC FURNACE AND METHOD FOR OPERATION THEREOF

BACKGROUND OF THE INVENTION

The present invention relates to a method for operating a closed electric furnace for smelting which comprises effecting complete combustion in the furnace of by-product gases composed mainly of carbon monoxide produced during the reducing smelting of a cold or hot charge of metal oxides with carbonaceous reducing agents such as coke and coal, and heating the furnace charge with this combustion heat so as to reduce the electric power consumption.

Further, and more particularly, the present invention relates to a method for operating a closed electric furnace which comprises forcedly exhausting the furnace combustion gas through an exhaust duct to a heat exchanger attached to the electric furnace, effecting the heat exchange with cold blast introduced into the heat exchanger by a separate wind blower to obtain hot blast, using this hot blast as a secondary or third air for an oil and gas burner or in a drier etc., while adjusting the heat-exchanged combustion gas to an appropriate temperature, introducing it to a dust collector to remove dusts and releasing it to the air.

Further, the present invention relates to a closed electric furnace suitable for the above operation.

In a conventional closed electric furnace operation, by-product gases composed mainly of carbon monoxide are not burned in the furnace and are introduced through a plurality suction openings in the furnace cover to a gas cleaning device provided outside the furnace and are used as fuel.

SUMMARY OF THE INVENTION

It has been proved by the present inventors that the present invention is very useful from the points of heat efficiency, economy and safe guard against pollution and these advantage are achieved by the combination of an electric furnace designed for effective furnace combustion, a heat-exchanger for recovering the sensible heat, and a dust collector for dust removing of the combustion gas.

BRIEF DESCRIPTION OF THE DRAWINGS

The present invention will be described in detail referring to the attached drawings.

DETAILED DESCRIPTION OF THE INVENTION

One example of a closed electric furnace according to the present invention will be described referring to the attached drawings.

Figure 1:
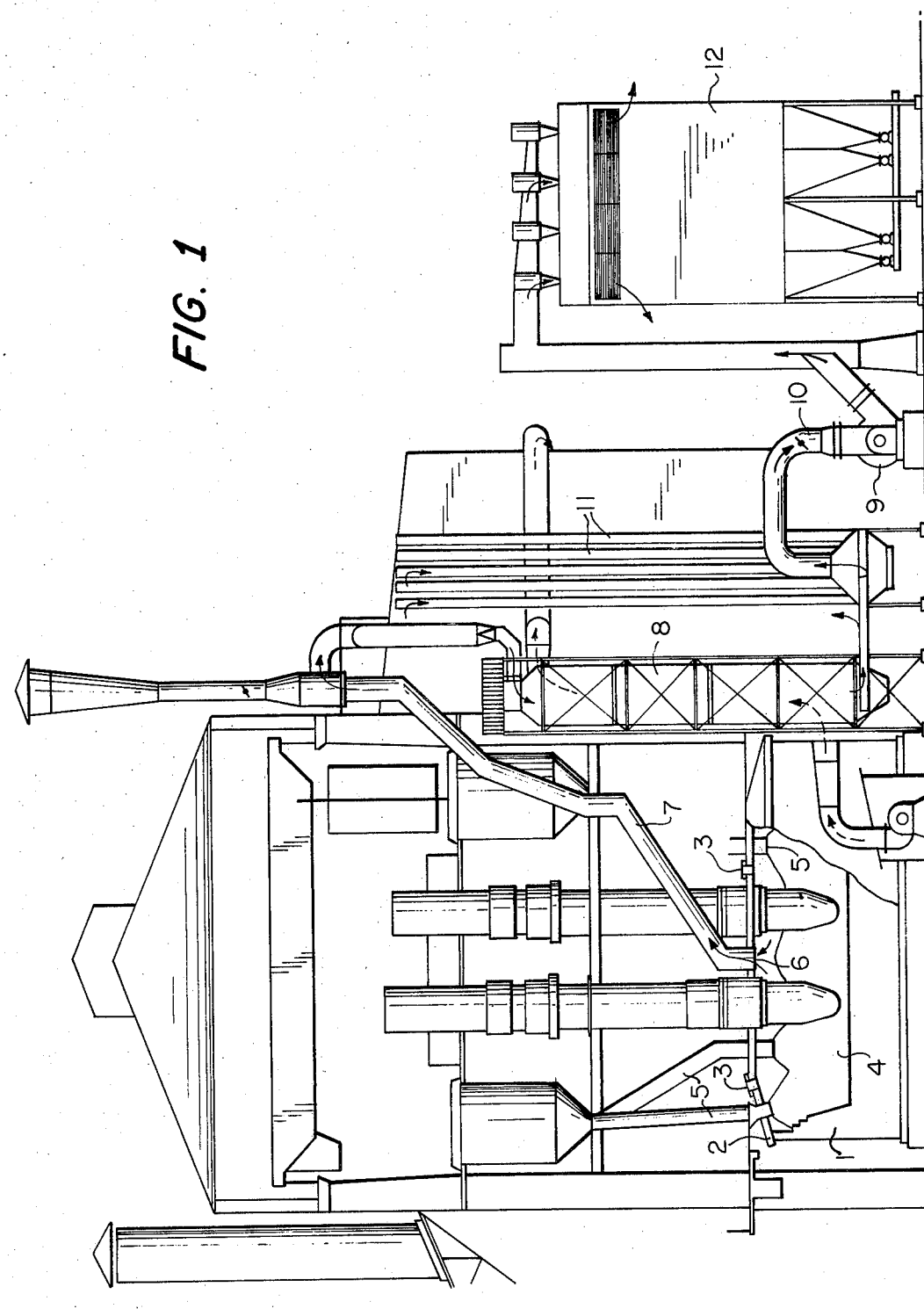
FIG. 1 shows a partial cross-section of a closed electric furnace used in the present invention.
Figure 2:
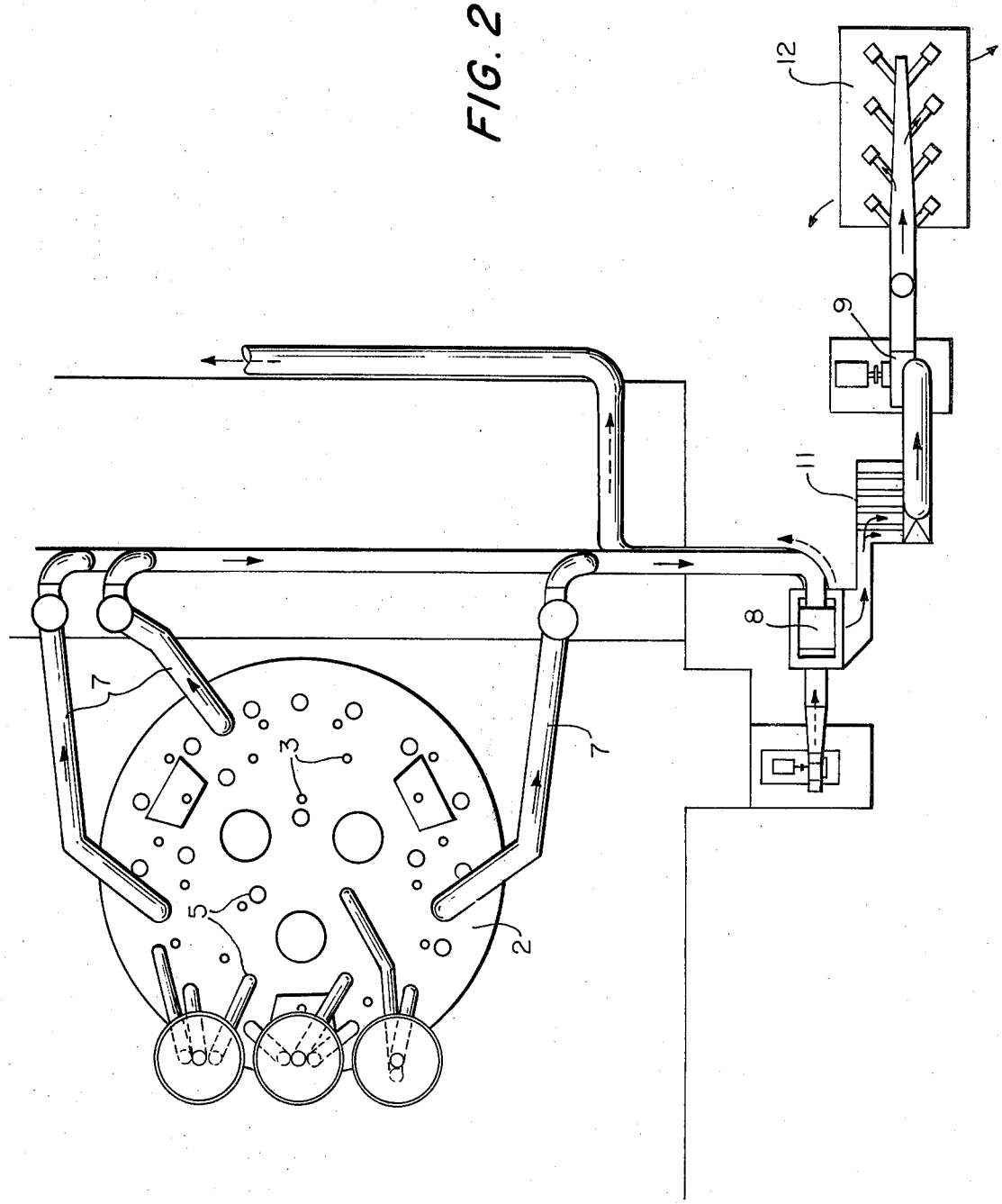
FIG. 2 shows a plan view of the upper side of the same.

As shown in FIG. 1 and FIG. 2, the air is sucked through a plurality of the air introducing holes 3 provided in the furnace cover 2 of the furnace 1 and by-product gases composed mainly of carbon-monoxide coming from the surface of the furnace charge are completely burnt instantly in the furnace, and the furnace charge 4 is heated by the combustion heat and the radiant heat.

Further, according to the electric furnace of the present invention, a plurality of heat-resistant charging chutes 5 are provided through the furnace cover 2 so as to maintain combustion space enough for complete combustion of the by-product gases in the furance, and the size of the chutes is determined depending on their positions so as to maintain an optimum distance between the inside wall of the furnace cover and the surface of the furnace charge.

Further, according to the present invention the combustion gases in the furnace are forcedly exhausted by a suction fan 9 provided behind the heat exchanger 8 through a plurality of exhaust holes 6, also provided in the furnace cover and the exhaust duct 7 so as to maintain a negative pressure in the furnace. For maintaining an optimum combustion condition in the furnace, a remotecontrolled butterfly damper 10 is provided between the suction fan 9 and the heat exchanger 8 so as to control the amount of the exhaust gas to adjust the air flow for the combustion into the furnace. Also, the combustion gas after heat exchange is adjusted to an appropriate temperature by a secondary air cooler 11 and introduced into a bag-filter type dust collector 12 where it is removed of dust and released into the air.

Figure 3:
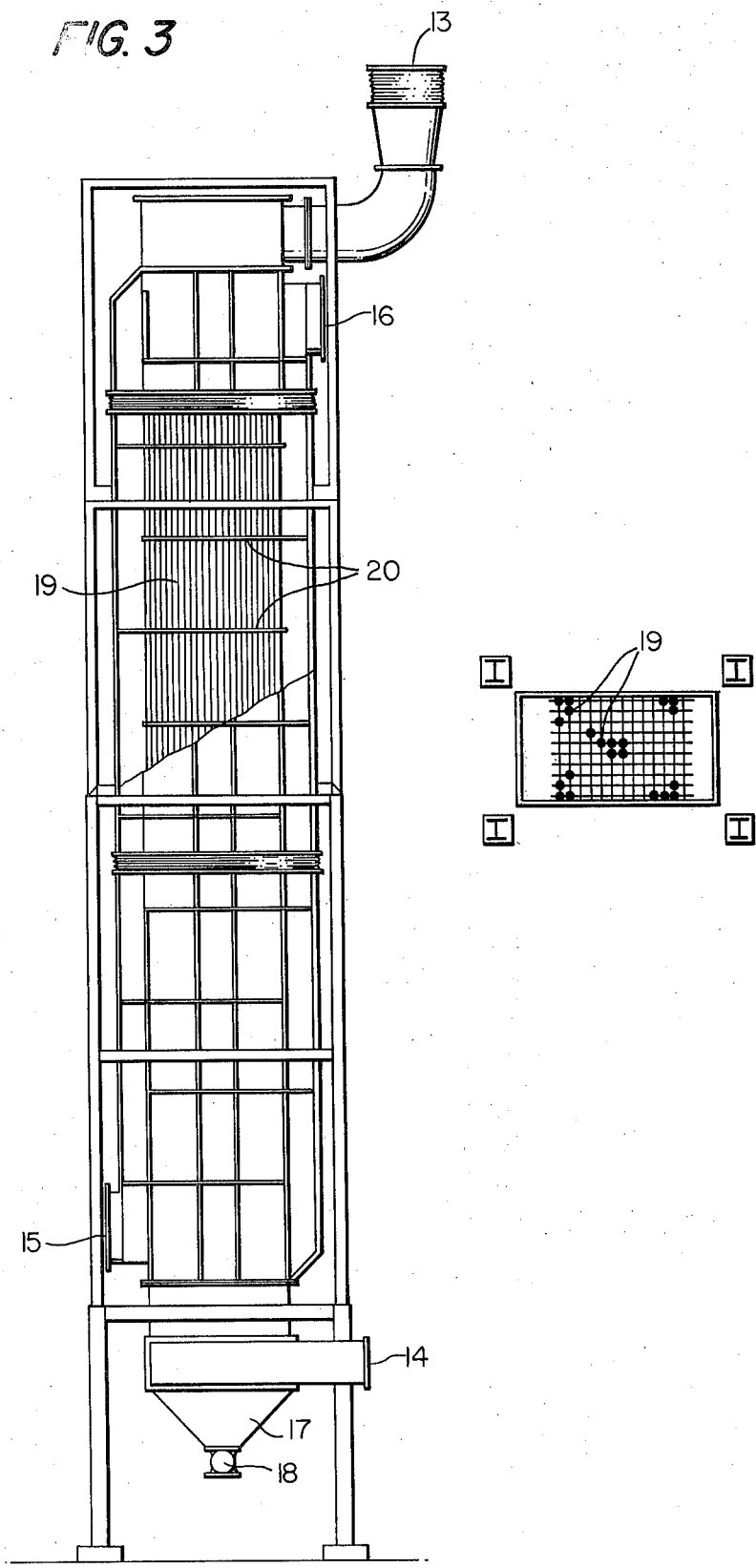
FIG. 3 shows one example of the heat exchanger used in the present invention.

Next, one example of the heat exchanger used in the present invention will be explained by referring to FIG. 3.

The outside wall of the heat exchanger 8 is lined with heat insulating board (in this case 100 mm thick) so as to prevent heat dispersion from the shell, and comprises an inlet hole 13 for high temperature combustion exhaust gas from the electric furnace 1, an exhaust hole 14, a blow-in hole 15 for blowing in the cold blast from the blast fan, a hot blast take-out hole 16, a dust hopper 17, a rotary valve 18 for taking out dust and a heat exchange section 19.

The heat exchange section is composed of 120 alloy steel pipes of 80mm diameter and 14.3m length arranged in a perpendicular direction, and separation plates 20 are provided with a space of 2.6m so as to cause the cold blast to flow in a zig-zag manner to enhance the heat exchange efficiency. In this example, the total heat conductive area is 480m².

The high temperature exhaust gas from the electric furnace 1 flows inside the steel pipes downward from the upper section, to give its sensible heat to the inside walls of the pipes and is exhausted from the exhaust hole. Meanwhile, the cold blast forced in through the blow-in hole 15 at the lower section at the left side of the heat exchanger 8 flows upward from the lower portion in a zig-zag manner, contacting the outside walls of the pipes to absorb the heat and become hot blast and is transferred from the take-out hole 16 to be used such as secondary or third air for an oil or gas burner for example.

Next, one example of the method of the present invention will be described.

Figure 4:
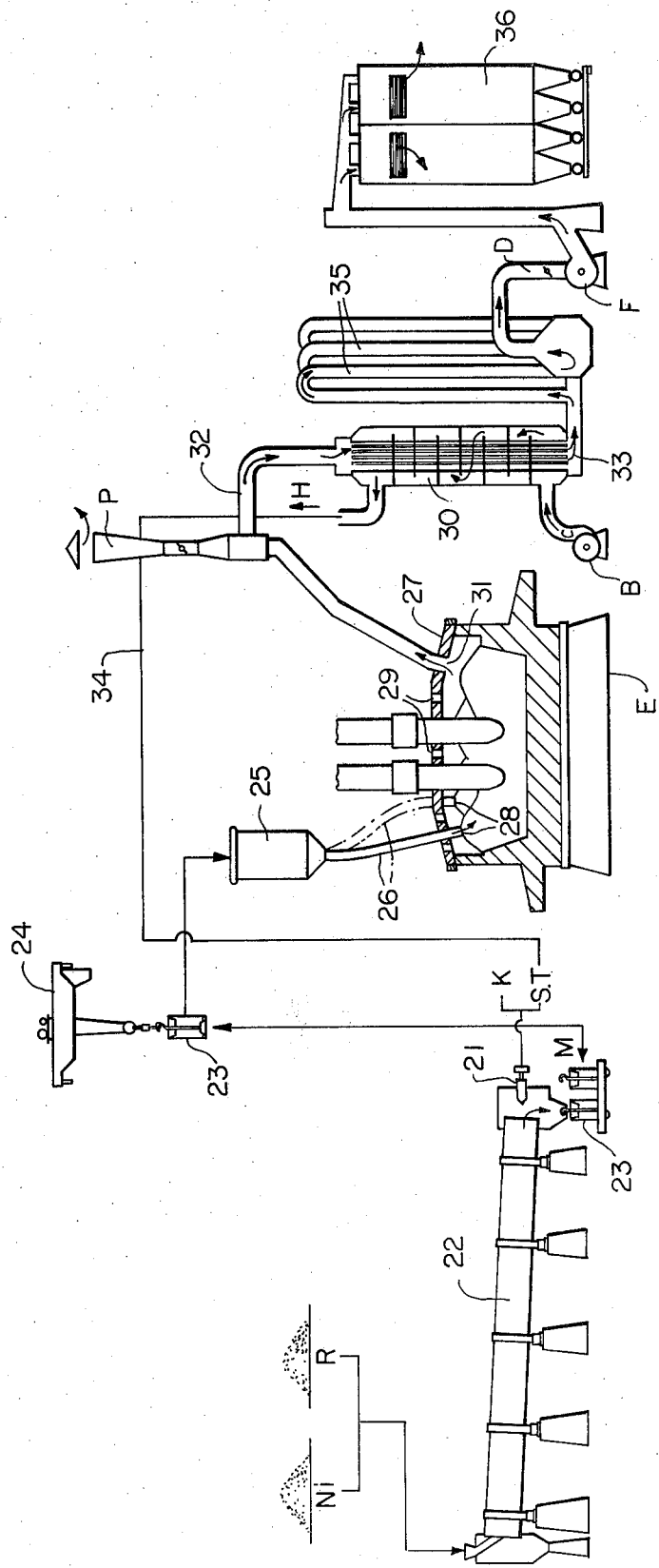
FIG. 4 shows a flow-sheet of a ferro-nickel production process according to the present invention.

FIG. 4 shows a process flow sheet for production of ferro-nickel according to the present invention.

In this example, a rotary kiln (4.7m diameter, 100m length) for calcining nickel ore, a closed electric furnace (25,000 KVA) a heat exchanger for recovering exhaust heat, and a bag-filter type dust collector are used in combination and hot charges are used.

Calcined nickel ore heated by an oil burner 21 is discharged from the rotary kiln 22 at about 1,000°C and received in a container 23 lined with castable cement.

The calcined nickel ore in the container 23 is transferred by a crane 24 and temporarily stored in a tank 25 lined with castable cement on the furnace, and then continuously charged into the furnace through the chute 26 lined with castable cement and a heat resistant chute 18 through the furnace cover 27. The temperature of the calcined nickel ore as charged into the furnace is lowered to about 700°C due to heat dispersion during its transfer to the tank 25 on the furance and storing in the tank 25 and the chutes. However, by burning the by-product gases coming from the surface of the furnace charged with the air introduced through the air suction hole 29, the calcined nickel ore in the furnace is again heated to about 1,000°C. The consumption of calcined nickel ore per one ton of pure nickel is 38,541 kg so that the increase of the sensible heat by the temperature rise of 300°C is 38,541kg/ton of Ni $\times$ 0.24kcal/deg.kg $\times$ (1,000° - 700)°C = 2,775 $\times$ 10³kcal/ton of Ni If converted into power, the reduction of 3,230 KWH/ton of NI is possible theoretically. The power consumption per one ton of pure nickel in a conventional art is 23,140KWH/ton of Ni, but by the application of the furnace complete combustion method of the present invention about 2,500 KWH/ton of Ni is reduced and thus the power consumption is 20,640 KWH/ton of Ni. The typical chemical analysis of the by-product gas produced by the reducing reaction in the furnace is; CO : 86.5 percent, $CO_2$ : 10.0 percent, $H_2$ : 1.5 percent and its amount is 2,100 Nm³/ton of Ni. Therefore, the combustion heat of the by-product gas is;

$$CO \quad \frac{2,100 \times 0.865 \times 28}{22.4} \times 2,430 \text{ kcal/kg} = 5,520 \times 10^3 \text{ kcal}$$

$$H_2 \quad \frac{2,100 \times 0.015 \times 2}{22.4} \times 28,650 \text{ kcal/kg} = 80 \times 10^3 \text{ kcal}$$

$$\overline{5,600 \times 10^3 \text{ kcal}}$$

The heat amount is well enough for increasing the sensible heat to the calcined nickel ore.

Next, the operational results of the heat exchanger will be explained. In the practice of the present invention, one heat exchanger 30 is arranged, and the high temperature (1,000°C) of exhaust gas produced by the complete combustion in the furnace is forcedly exhausted from three exhaust holes 31 provided in the furnace cover 27 and collected in one exhaust duct 32 connected to the heat exchanger. The amount of high temperature combustion exhaust gas of more than 750°C in average coming into the heat exchanger from the furnace is 16,500 Nm³/h, and the temperature of the exhaust gas at the exhaust hole 33 of the heat exchanger is about 400°C. The amount of the cold blast forced into the heat exchanger 30 at about 25°C is 30,000 Nm³ per 1 hour, and the temperature of the hot blast thus obtained is 190°C. The hot blast coming of the heat exchanger at a rate of 30,000 Nm³/h is passed through the hot blast duct 34 applied with heat insulating materials and is used as the secondary air S and the third air T for the oil burner 21 in the rotary kiln 22 for calcining the nickel ore.

Supposing the temperature lowering in the hot blast duct 34 is 40°C, the sensible heat brought in by the secondary air S and the third air T is:

30,000 Nm³ $\times$ 0.311 $\times$ (190° - 40)°C = 1,400 $\times$ 10³ kcal/h

If converted into the heavy oil amount, this is about 140 l/h. Therefore, the heavy oil consumption to be reduced per one ton of pure nickel is 140 l/ 1.1 ton of Ni = 127 l/ton of Ni, since the amount of pure nickel produced per 1 hour is 23,000 KWH/20,640 KWH/ton of Ni = 1.1 ton of Ni/H if the power load in the electric furnace is 23,000 KW /h and the power consumption is 20,640 KWH/ton of Ni.

On the other hand, the exhaust gas of 400°C coming out of the exhaust hole 33 of the heat exchanger is adjusted to about 160°C by the secondary air cooler 35, and passed into the bag-filter type dust collector 36 where it is subjected to dust removing treatment, and then released into the air.

The heat conducting efficiency ($\eta$) of the heat exchanger used in the present invention is calculated as follows if the average specific heats of the cold blast and the combustion exhaust gas are 0.311 kcal/Nm³ and 0.340 kcal/Nm³ respectively.

16,500 Nm³ $\times$ 0.340 $\times$ (750° - 400°C)$\eta$ = 30,000 Nm³ $\times$ 0.311 $\times$ (190° - 25)°C therefore $\eta \approx 0.78$ As described hereinbefore, power consumption is greatly saved in the production of ferro nickel and other ferro alloys in a closed electric furnace by the organic combination of the closed electric furnace, the heat exchanger, and the dust collector according to the present invention, and consumption of fuels such as heavy oil and gas in a rotary kiln, a drying furnace or a heating furnace is greatly reduced by using the hot blast from the heat exchanger as the secondary or third air for these furnace, thus improving substantially the economy and production efficiency.

What is claimed is:

1. A method for operating a closed electric furnace for the smelting of ferro-nickel, ferro-alloys, pig iron, titanium slag and the like, said process comprising the steps of:

providing an electric furnace having a cover thereon, said cover having therein a plurality of air inlet holes;

supplying into said furnace a charge of material to be smelted, while forming and maintaining a combustion space between said charge and said cover;

operating said electric furnace to smelt said charge and to thereby form in said combustion space carbon monoxide containing by-product gases;

sucking combustion air through said air inlet holes into said combustion space and completely burning herein the carbon monoxide from said by-product gases to form combustion gas;

heating new charges of said material in said furnace by the heat from the burning reaction of said carbon monoxide and by the radiant heat from operation of said electric furnace;

forcedly exhausting said combustion gas from said combustion space by means of an exhaust fan of a dust collector;

passing said thus exhausted combustion gas through a heat exchanger and therein effecting heat exchange between said combustion gas and a cold blast, thus cooling said combustion gas and heating said cold blast to form a hot blast;

passing said thus cooled combustion gas to said dust collector and therein removing dust from said cooled combustion gas;

releasing said thus purified combustion gas to the atmosphere; and using said hot blast in a separate processing operation.

2. A method as claimed in claim 1, wherein said hot blast is used as secondary or tertiary air in a burner of a kiln for preheating said material to be smelted.

3. A method as claimed in claim 1, wherein said hot blast is used as a heat source in a drying or heating furnace.

4. A smelting apparatus comprising:

a closed electric furnace having a cover thereon, said cover having therein a plurality of air inlet holes, means for introducing into said furnace a charge of material to be smelted, and an exhaust outlet, there being a combustion space between said charge and said cover;

means for operating said electric furnace to smelt said charge and to form carbon monoxide containing by-product gases;

fan means connected to said exhaust outlet for reducing the pressure in said combustion space and for thus sucking air through said air inlet openings into said combustion space and completely burning therein the carbon monoxide from said by-product gases to form combustion gas, said combustion gas being withdrawn from said combustion space through said exhaust outlet by said fan means;

heat exchanger means positioned between said exhaust outlet and said fan means for cooling said combustion gas, said heat exchanger means including means for passing a cold blast by said combustion gas in heat exchange relation therewith, thereby cooling said combustion gas and heating said cold blast to form a hot blast; and dust collector means positioned downstream of said fan means for receipt of said cooled combustion gas and for removing dust therefrom.

5. An apparatus as claimed in claim 4, further comprising butterfly damper means positioned between said dust collector means and said heat exchanger means for adjusting the flow rate of said combustion gas.

6. An apparatus as claimed in claim 4, further comprising means for passing said hot blast to a burner of a kiln, as secondary or teritiary air thereof, for preheating said material to be smelted.

* * * * *